J. E. GARRETTE.
METHOD OF AND APPARATUS FOR PRODUCING AND EXHIBITING COMPOSITE PICTURES.
APPLICATION FILED FEB. 17, 1915.

1,156,896.

Patented Oct. 19, 1915.
4 SHEETS—SHEET 1.

Witnesses:

Inventor
John E. Garrette
By James N. Ramsey
Attorney

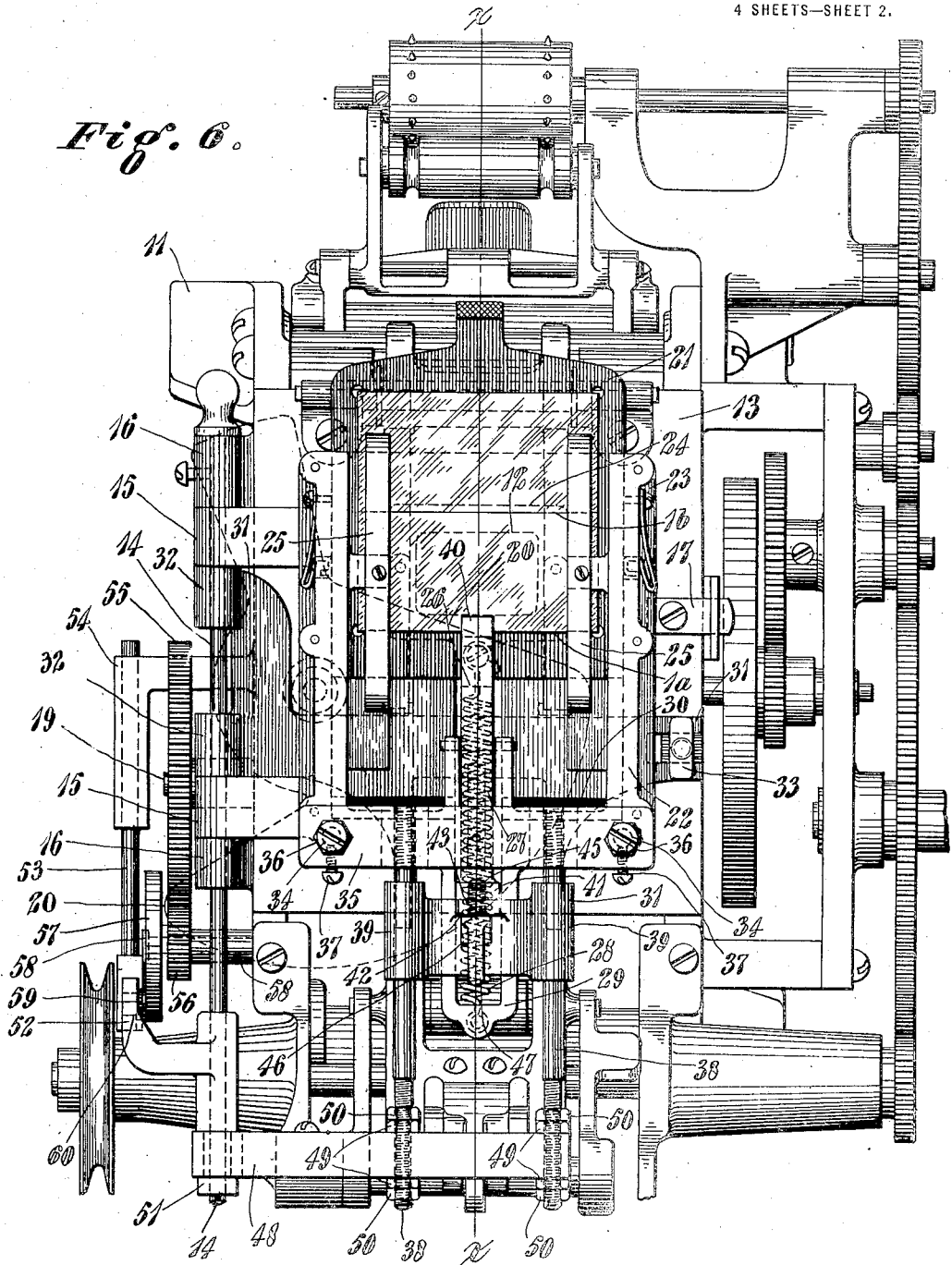

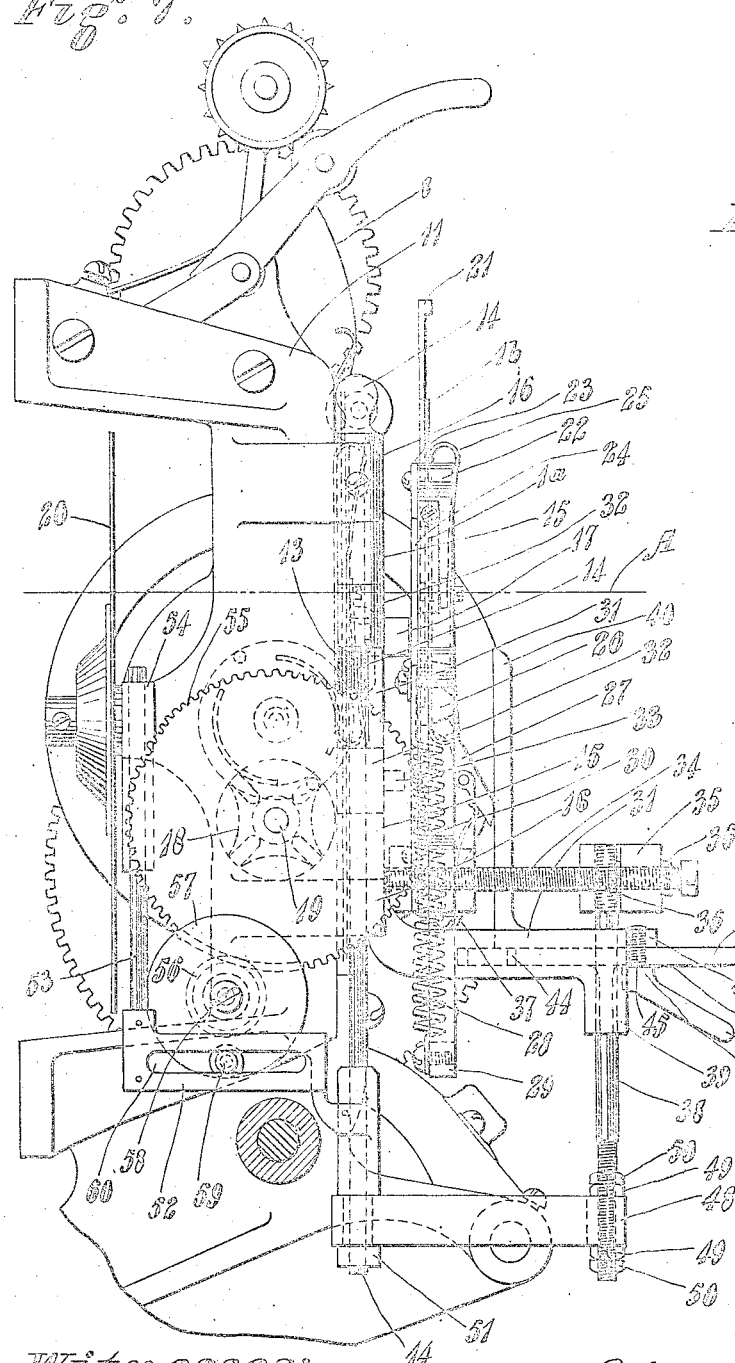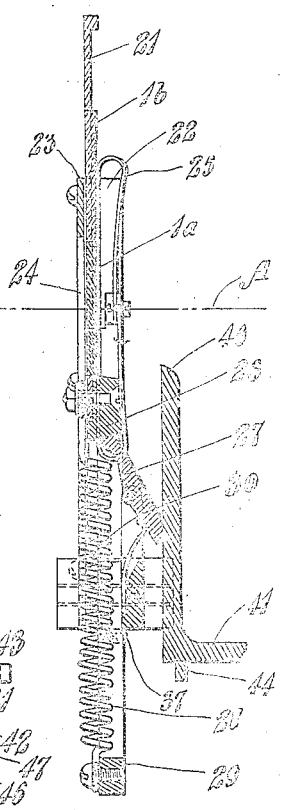

J. E. GARRETTE.
METHOD OF AND APPARATUS FOR PRODUCING AND EXHIBITING COMPOSITE PICTURES.
APPLICATION FILED FEB. 17, 1915.
1,156,896.
Patented Oct. 19, 1915.
4 SHEETS—SHEET 4.
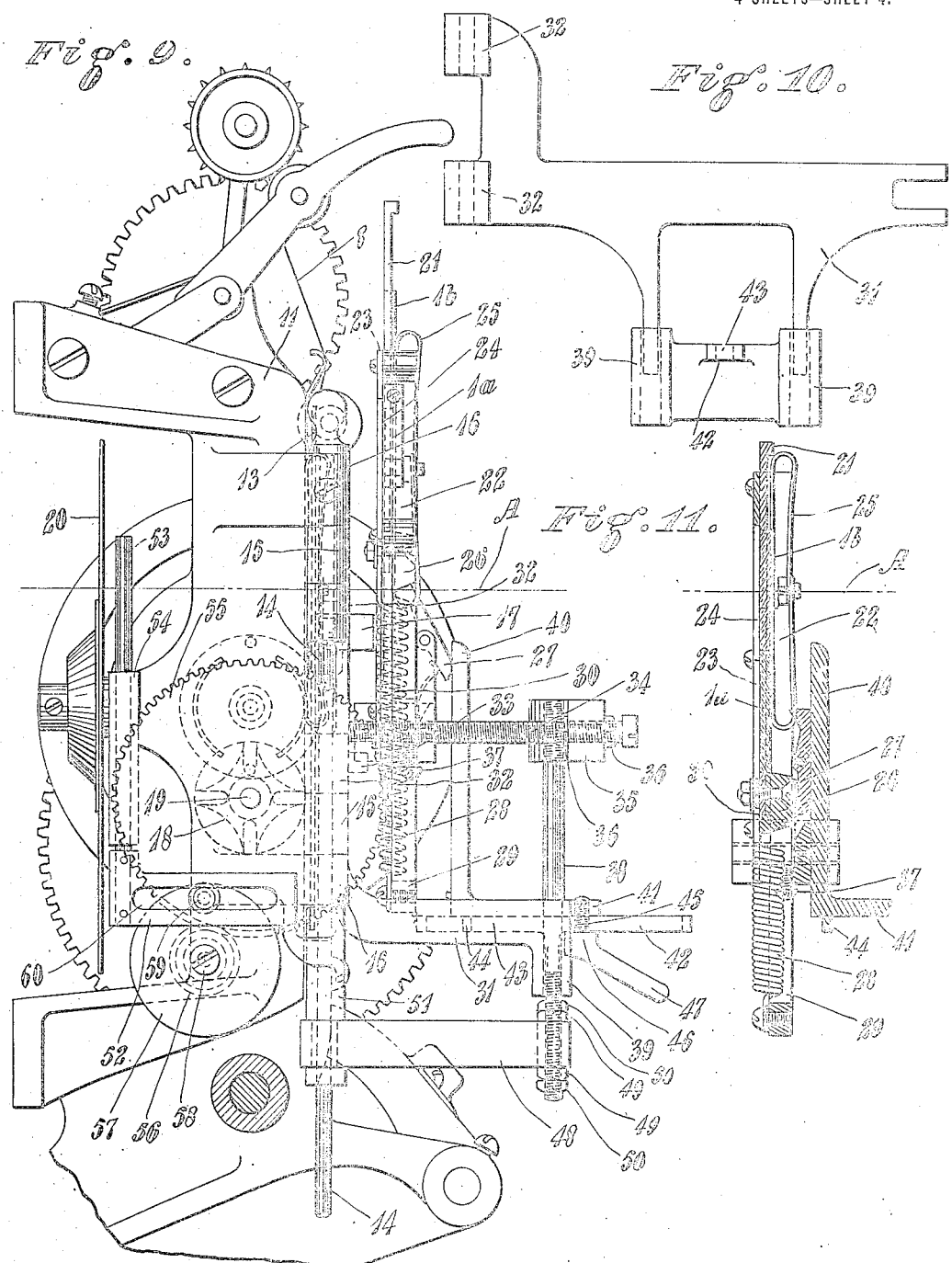

UNITED STATES PATENT OFFICE.

JOHN E. GARRETTE, OF CINCINNATI, OHIO, ASSIGNOR OF ONE-THIRD TO JAMES M. WAGNER AND ONE-THIRD TO ADOLPH FUERHAMMER, BOTH OF CHICAGO, ILLINOIS.

METHOD OF AND APPARATUS FOR PRODUCING AND EXHIBITING COMPOSITE PICTURES.

1,156,896. Specification of Letters Patent. Patented Oct. 19, 1915.

Application filed February 17, 1915. Serial No. 8,770.

*To all whom it may concern:*

Be it known that I, JOHN E. GARRETTE, a citizen of the United States, and a resident of Cincinnati, in the county of Hamilton and State of Ohio, have invented certain new and useful Improvements in Methods of and Apparatus for Producing and Exhibiting Composite Pictures, of which the following is a specification.

My invention relates to picture-exhibiting, and more especially to projected and moving pictures. Its object is to combine a still or fixed scene with a scene in which the movements of objects are represented in such a manner that each scene will be the complement of the other, and in which the scenes will harmonize and produce the effect on the spectator of a single scene; thus permitting of a saving by permitting acts or plays to be produced without elaborate stage setting, or without producing the act or play at the actual place of the scene desired in connection with such act or play.

The further object of my invention is to secure the effect of the natural colors in such a composite scene readily and economically by confining the colors to the fixed scene, and so selecting the fixed and movable scenes with respect to each other that there will be produced upon the spectator satisfactorily the effect of having the entire composite picture colored; or at least of subduing the contrast between the uncolored and colored parts.

A further object of my invention is to save in the gelatinizing or sensitizing of the film of the moving picture by virtue of the use of the fixed scene in connection therewith.

My invention consists in the method and in the apparatus for carrying out this method, and in the parts and in the details of construction and arrangement of the parts of said apparatus as will hereinafter be more fully described and claimed.

Figure 4:
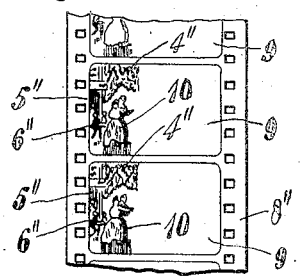
Figure 1:
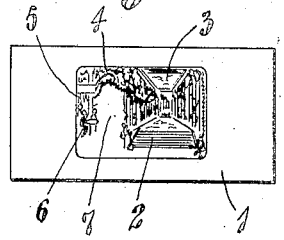
Figure 2:
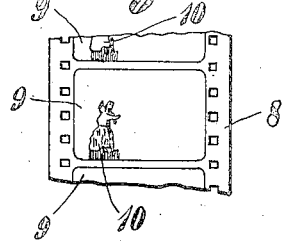
Figure 2:
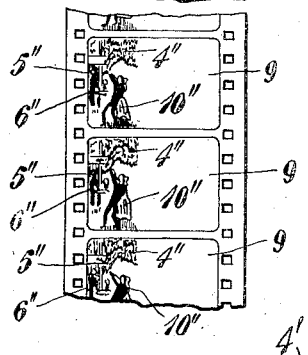
Figure 3:
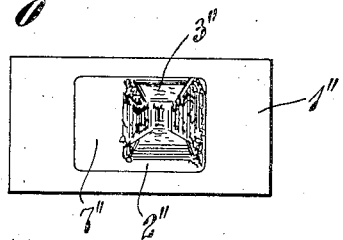
Figure 5:
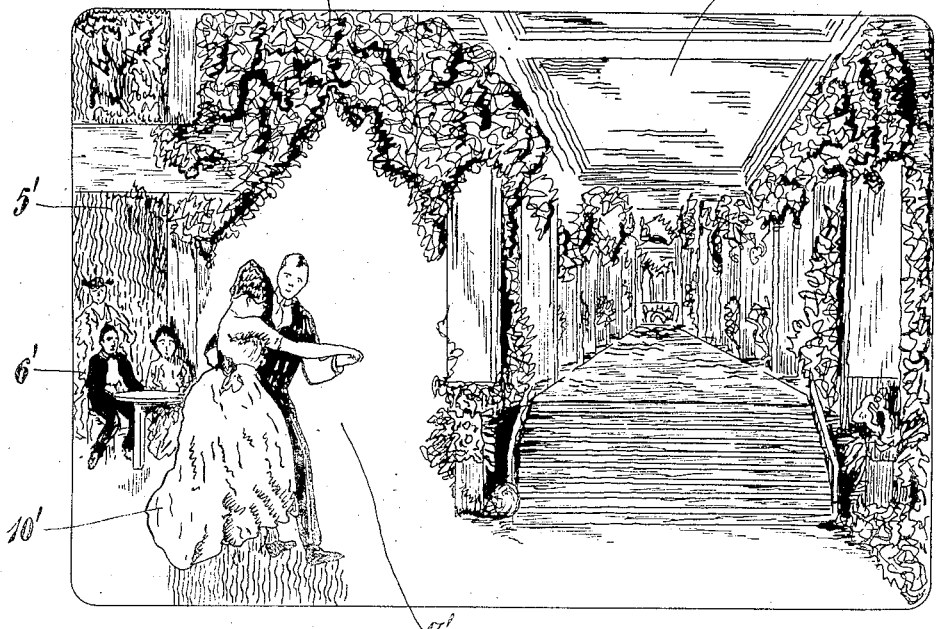

In the drawings: Figure 1 illustrates a slide for projecting a fixed scene; Fig. 2 represents part of a film for exhibiting a moving scene in conjunction with the fixed scene of the slide of Fig. 1; Fig. 3 illustrates a slide modified from that of Fig. 1; Fig. 4 shows the parts of a film suitable for operating in conjunction with the modified slide of Fig. 3; Fig. 5 represents the complete composite scene as shown by combining the slide and film of Figs. 1 and 2 or the slide and film of Figs. 3 and 4; Fig. 6 is a front elevation of a moving picture machine provided having combined therewith slide carrying and operating apparatus for carrying out my method, the parts being in their position wherein the slide view and film view are in alinement; Fig. 7 is a side elevation of the apparatus as shown in Fig. 6; Fig. 8 is a vertical section through the slide carrier on the line $x$—$x$ of Fig. 6; Fig. 9 is a side elevation similar to Fig. 7, but showing the parts in their positions when the slide is moved up out of alinement with the film and thus out of the area of the concentrated heat rays; Fig. 10 is a detail front elevation of the swinging bracket for the slide carrier; and Fig. 11 is a section similar to Fig. 8, but showing the positions of parts of the apparatus when the slide holder has been shifted with the slides.

As shown in Fig. 1, the slide 1 of glass or other suitable transparent material has thereon a positive pictorial representation 2 adapted, after the manner of stereopticon slides, to produce a fixed scene on a screen when inserted in the line of light of suitable projecting apparatus, such as is usually employed in connection with moving picture machines. The right hand and major portion 3 of the pictorial representation 2 on the slide 1 is an interior scene, the upper part of which has an extension 4 over into the left hand and minor portion of the view, and with a downward extension 5 at the extreme left hand side of this minor portion, which downward extension represents additional interior background, and, as here shown, a group of persons 6 in the remote foreground. The right hand part 7 of the left hand minor portion of the view is left void and preferably it is transparent and clear; and the left hand side of the scene 3 is such as to avoid the effect of abrupt termination of this scene 3, so that the left and right hand portions of the slide view produce as near as may be the effect of a complete interior scene.

For operating in conjunction with the slide of Fig. 1, a film 8 of standard size and of the usual mechanical construction has a series of views 9 that are as taken with the usual kind of apparatus for taking moving pictures which views, as here shown, are of two moving figures 10. When the picture of these moving figures 10 is taken for the film 8, the movements of the actual figures are confined to such an area of exposure before the picture taking machine that their movements, as represented by the film, will be confined to a space corresponding in size and location to the void space 7 of the slide 1 when the view on the slide is brought into such position that each successive view 9 on the film 8 will aline with the view 2 on the slide 1. With this arrangement and this alinement of the views, the figures 10, in all of their movements as represented by the successive views 9 on the film 8, will be projected on the screen in the void space left in the projection on the screen from the view 2 of the slide 1, with an effect similar to that represented in Fig. 5, wherein the fixed right hand scene 3' with its upper left hand extension 4' and extreme downward extension 5' and group of figures 6' forms a scenic setting for the moving figures 10' in the void space 7'.

With the above arrangement it will be noted that the group of figures 6 of the view 2 of the slide 1 will, as projected on the screen at 6' in Fig. 6, be fixed along with the parts 3', 4' and 5' of the fixed scene. If it be desirable to also represent movements of these figures, the arrangement of slide and film of Figs. 3 and 4 may be employed. Thus, the slide 1'' has the view 2'' in which the interior scene 3'' is confined entirely to its right hand major portion of the view, leaving the entire left hand minor portion 7'' void and preferably clear. The film 8'', for operation in connection with this slide 1'', then may have upon it the entire left hand portion of the scene as shown in Fig. 4, including the upper part 4'' and extreme left hand part 5''; with the group of figures 6'' as well as the figures 10'' in the foreground.

In Fig. 4, the film 8'' is represented in two parts from which an extended middle section has been broken away, so that the lower part of the film represents readily perceptible subsequent positions of the figures 10'' in the foreground. It will be understood that a similar representation of these figures 10'' would also correctly represent additional movements of the figures 10 of the film 8 in Fig. 2. However, in Fig. 4, since the figures of the group 6'' in the remote foreground are represented on the film instead of on the slide as in the example of Figs. 1 and 2, movements of these figures may also be represented as indicated in the lower part of the film. Also, with this arrangement, the figures 10'' may move throughout a greater proportion of the area allotted to the film than they could in the example of Figs. 1 and 2, where they were not permitted to be in the extreme left hand part of this portion, due to the presence on the slide of the background and the fixed figures 6 in the remote foreground.

While the example shown and above described is one of an interior scene, it will be understood that my method of producing and exhibiting is also applicable to exterior scenes. Also, it is not necessary that the fixed scene occupy the major portion of the picture as in this example; nor is it necessary that either the fixed or movable scene be confined to one side only of the picture; nor to the bottom nor the top thereof; but that all of these details of relative arrangement of the fixed and movable scenes may be varied in accordance with the peculiar requirements of any act or play that is being produced and exhibited according to my method. In any event, it will be possible to greatly reduce the labor and expense of producing many acts or plays by merely taking moving pictures of the actors and other objects that are to have movement in the act or play, and then suitably arranging a slide to show the fixed objects in the scene of the act or play. This makes it possible to utilize many scenes which could be secured as the actual scenes of the usual moving pictures only by the most elaborate and expensive stage setting, which even then would fall short of the correctness of detail and the appearance of genuineness; or to secure the genuine scene would involve the production of the act or play upon the actual scene, necessitating travel and other expensive operations. By my method, any desired scene may be reproduced upon a suitable slide after the manner of making stereopticon slides from any pictorial representations that may be found in art collections, or in books, or any other pictorial representations which show the scenes with sufficient detail and which produce a sufficiently natural effect. Such pictorial representations, for the purpose of my invention, are of course preferably photographs or very skilfully executed paintings, or skilful reproductions of either of these. It will be understood that a slide produced from any of these photographs or paintings or drawings may very well be superior to any view, either on a slide or film, which can be produced from the usual scenic paintings used in theatrical work, or from even the most skilful and elaborate stage settings designed to reproduce such scenes, both in completeness of detail, and in the effect of naturalness or genuineness as produced on the spectator. Furthermore, it is far more convenient to color a single slide to represent the natural colors of the fixed scene than it is to color all of the successive views of a film made of such a scene. Therefore, according to my method, a picture may be exhibited in which the actors and other movable objects have their actual movements represented, but in which the fixed parts of the scene may be very carefully and skilfully colored to give as near as possible a correct representation of the natural colors of the fixed scene. For operation in connection with such a colored fixed scene, the film may have colors applied to it to harmonize better with the colors of the fixed scene than would the black and white representation as afforded by the uncolored film; or the coloring of the film may be avoided entirely and yet a sufficient harmony of color be supplied by the use of a tinted slide in connection with the film and scenic slide, which, for this purpose, may be tinted throughout part only of its extent, to confine the tint or tints to the particular parts of the film represented, as may be required. However, in many instances, the moving and fixed scenes may be so combined that no unsatisfactory result will be produced by the combination of the uncolored film with the colored slide. The attention of the spectator is naturally confined mostly to the moving objects of the scene, and the fixed parts of the scene, especially those in the background, are not closely scrutinized, so that the colored slide part of the screen, especially if it be the major portion thereof, will impart to the entire screen the effect of being naturally colored, owing to the imposing effect produced by its fidelity to detail and color as representing some imposing interior or exterior scene. The slight disadvantage of lack of natural color throughout all the scene will be outweighed by the concentrating effect of the moving figures, although they are uncolored, along with the general imposing effect produced by the fixed scene with its completeness of detail and natural colors.

Another advantage of my method is the saving in the sensitizing and other materials used in the production of the film, since only a portion, and in many instances, such as in the example of the drawings, only a minor portion of the film need be sensitized or treated; the other portion being left entirely uncovered and exposing the surface of the celluloid or other transparent material of which the film is composed. This saving is not accomplished at the expense of extent of the projected picture, because the other portion of the picture is produced by the slide as a fixed scene. The projection of this other portion of the picture, involving the projection of only a single slide, and involving the expense of sensitizing and treating only the single slide, is of very small cost compared with the cost of sensitizing and treating a corresponding portion of all of the views on a moving picture film that would be necessary to project this scene along with the moving scene on a single film. This latter saving in labor and expense of production is peculiar to the employment of the slide for producing the fixed part of the scene. However, with respect to the saving achieved by reproducing the fixed scene from some pictorial representation rather than from a stage setting or from the actual scene, this may be attained with the use of an additional film instead of the slide, upon which additional film a copy of the pictorial representation is reproduced after the ordinary manner of taking any moving picture, although of course, being taken from the fixed pictorial representation, this fixed part of the scene will be the same in all views of the film. Such an additional film would require additional film operating mechanism on the machine, operated in synchronism with the film for projecting the moving part of the scene. Since all of these views of the fixed scene on the additional film would require to be colored if the scene is to be shown in colors, this modification of my method is inferior to that using the single slide for the fixed scene with respect to the saving in expense of coloring, in addition to being inferior in the absence of the last described saving in sensitizing and treating. In fact it would be more expensive, because an entire additional film is required as well as the care of the additional mechanism for operating the additional film. I therefore much prefer the use of the single slide for the fixed part of the scene in combination with the film for producing the movable parts of the scene. In thus referring to a single slide however, it will be understood that it is not necessary, in conjunction with any single film for exhibiting an act or play, that only one slide showing only one fixed part of the scene be used throughout the run of the film. Where the fixed part of the scene may be required to be changed, another slide may be substituted at the proper stage of the exhibition of the act or play, where the film will of course have its arrangement changed at that point to properly aline and harmonize with the changed fixed scene. For instance, the scene may change from that illustrated in the drawings to one in which the moving figures would occupy a position near the middle or at the right of the fixed scene; for which the views from that point onward throughout the period in which this changed fixed scene is used would occupy corresponding middle or right-hand positions on the film, with the other parts of the film left void and clear. This change of slides may be effected without interruption of the exhibition by having upon the film a proper number of views in which the fixed scene is not involved; which may be views in which the action extends throughout the width of the film, or may be suitable annunciatory parts of the film, announcing or explaining the act or part of the play which is to follow and which will involve the changed scene as projected from the changed slide.

In carrying out my method, the slide to be used in conjunction with the film may be mounted on the moving picture machine at a suitable distance from the film to secure the proper sharpness of detail in the projection of the scene from the slide as well as that from the film. For this purpose, the slide may be mounted between the film and the light source, or on the other side of the film from the light source, even on the other side of the shutter from the film, if such distance of the slide be permissible under certain conditions dependent upon the sharpness of effect to be produced by the slide. Furthermore the scale of dimensions of the view on the slide may, if necessary, be varied with respect to those of the view on the film to cause the fixed scene to accurately coincide with the moving scene. As the apparatus for carrying out my method is herein illustrated, the scale of the views on the slide and film is the same.

The slide is located very near to the film between it and the light source, in such a manner as to have its view very accurately alined with the view of the film along the line of the projection, indicated by the line A in the drawings.

If a single slide is continuously exposed to the direct heat rays of the light source throughout the exhibition of a film, it is liable to be damaged by the heat. This liability is not so great if the slide is made of glass or other non-inflammable transparent material; but since it may be desirable to make the slides of celluloid or similar inflammable transparent material such as the films are made of, such constant exposure is almost certain to result in ignition of the slide. This may be compensated for by having a number of slides of the same scene and substituting one for the other at such frequent intervals as to avoid ignition or other damage. For this purpose some form of feeding mechanism may be provided to automatically supply any number of different slides of the same scene; or as herein shown, I may cause the slide to move out of the most intensely heated area and back thereto during the period of time in which the film is shifted by the machine to bring into the projecting area each successive view on the film. By this movement of the slide it is thus kept out of the intensely heated area for a considerable proportion of the total time of exhibition; and in addition, its movement in contact with the air of the less heated areas produces a cooling effect on the slide as well as on the material of the means provided for holding and shifting the slide. In accordance with these requirements, a well known moving picture machine has the frame 11 supporting suitable mechanism for carrying the film 8 down past the aperture 12 which defines the projecting area of the view on the film and behind a plate or door 13 that is hinged at one side of the frame 11 on a vertical pin 14 by means of lugs 15 on the door between upper and lower lugs 16 on the frame, which door is held by a latch 17 at the side opposite from the hinge pin.

As is well known to those experienced with moving picture machines of the kind herein shown as an example, the film 8 is moved intermittently by means of a star wheel 18 and its shaft 19 in such a manner that the film is held stationary with its view within the projecting area for a certain period of time, and is then shifted during a shorter period of time to bring its next view into such area. In conjunction with the star wheel, the shutter 20 is rotated to cover the projecting area during the period of shifting and to leave it uncovered during the exhibiting period. These well known details of a moving picture machine are described to elucidate the description of the connection of my apparatus therewith. In this apparatus as shown, I have provided for convenient means of exhibiting successively, two slides 1$^a$ and 1$^b$. These two slides 1$^a$ and 1$^b$ are placed in a holder 21 which has an interior space in which the rectangular slides fit accurately, and this holder is somewhat thinner than the slides. This holder 21 slides down inside a frame 22 that is open at the top and has a back 23 with an aperture 24 amply large to uncover the part of the slide to be exhibited when the slide is in proper alinement with the film. Yieldable guides 25 on the front of the frame 22 press against the forward sides of the slides, thus holding them with ample firmness, yet permitting them to slide down in the frame with the holder 21. The lower side of the inner frame 21 has a strike 26, and a pawl 27, pivoted to swing in and out of the frame in a vertical plane on the bottom part of the frame, engages under this strike 26 and holds the holder 21 up at exactly the right height to bring the first or lower slide 1$^a$ in proper alinement with the film. A tension spring 28 is connected to the lower end of the holder 21 and extends down and is connected to a downward extension 29 on the bottom of the frame 22, so that when the pawl 27 is swung outward, out of engagement with the strike 26, this spring 28 will quickly pull the holder 21 down in the frame 22 until the lower edge of the holder 21 engages with the inner side 30 of the bottom of the frame 22, as shown in Fig. 11, thus bringing the second or upper slide 1ᵇ into proper alinement with the film. The frame 22 thus carrying the holder 21 and its operative mechanism, and with the slides carried in the holder 21, is suitably mounted on a bracket 31 that has lugs 32 by means of which it is hinged on the hinge pin 14 of the door or plate 13 of the moving picture machine. This bracket 31 has at the side opposite from the hinge a suitable latch 33 on the door or plate 13. Thus, the entire apparatus of my invention thus far described being mounted on the door or plate 13, permits the ready opening of this door or plate for removal and insertion of the film, the apparatus swinging around with the door or plate. Furthermore, this apparatus may be swung entirely away from the front of the machine without swinging the door or plate open, so that by thus swinging the slide carrying apparatus away, the slides may be taken out of it and new ones substituted therein, without interfering with the operation of the film and the projection therefrom of any matter desirable to make the exhibition continuous while the substitution of slides is taking place, as hereinbefore alluded to.

Where it is unnecessary or undesirable to shift the slides out of the heated area during each shift of the film, the slide carrying apparatus may be mounted on the bracket 31 without provision for up and down movement thereon. In either case, it is desirable to provide for adjustment of the slide carrying apparatus toward and away from the film. For this purpose, the frame 22 has horizontal studs 34 threaded through its bottom part at the sides, which studs are slidably mounted in a transverse yoke 35 and adjustably held therein by nuts 36 engaging with the rear and front sides of the yoke. By loosening these nuts 36 the studs 34 may be turned in the frame 22, or the nuts 36 may be turned on the studs 34 to bring the frame 22 to the desired position, after which the nuts are tightened; and set screws 37 passing up through the bottom of the frame may be tightened against the studs 34 where they pass through the frame, thus fixing the frame in its adjusted position with respect to the yoke 35. This yoke 35 is fixed on the upper ends of rods 38 which pass down through hubs 39 on the outer or forward ends of the bracket 31; and when no up and down movement of the slide is desired, these rods 38 may be fixed in these hubs of the bracket and may merely be adjusted up and down therein to secure the exact alinement of the slide with the film. Where the slides are to be moved up and down, these rods 38 are slidably mounted in the hubs 39 of the bracket 31 as shown, and form the guides for the up and down movement.

Where no up and down movement is desired, the pawl 27 may be directly engaged by the finger of the operator to disengage it from the slide holder 21; but where the slides are moved up and down, their quick movement precludes this direct engagement of the finger with the pawl. For operation of the pawl when the slides are being moved up and down, an upright engaging bar 40 is mounted so as to engage with the lower outwardly projected end of the pawl 27, and has an outwardly projected foot 41 resting upon a forwardly and backwardly extending guideway 42 on the bracket 31 near its middle. This guideway 42 has a longitudinal slot 43, and the inner end of the foot 41 has a stud 44 engaging in this slot, while its outer end has a clamping screw 45 which extends up through the slot and is threaded into the foot outside of or forwardly of the front of the bracket 31. This screw 45 has a head 46 engaging against the lower side of the guide 42 with a suitable handle 47 for turning the screw. The engaging bar 40 may be moved inward or outward along the guideway 42 and clamp at any desired position therealong. This arrangement allows it to be moved inward and clamped to hold the pawl 27 out of engagement with the inner slide carrier 21 at any adjustment of the frame along the studs 34, so that its proper position relative to the frame 22 may be maintained at any inward or outward adjustment of the frame 22 on the studs 34.

Where the slide is to be moved up and down during the shifting of the film as hereinbefore alluded to, the rods 38, slidable in the hubs 39 of the bracket 31 as above described, are extended down as shown, and adjustably fixed to a swivel yoke 48 by means of nuts 49 and lock nuts 50 on the rods 38 above and below the yoke, respectively. This yoke 48 extends to the left side of the machine and then inward or backward, where it embraces a reduced part of a sleeve 51 that is slidable up and down on a downward extension of the hinge pin 14 of the door or plate 13, and upon which hinge pin the bracket 31 is also hinged as hereinbefore described. Thus, the swivel yoke 48 may swing around on this sleeve 51 when the slide carrying apparatus is swung around, either by itself or with the door or plate 13, without disturbing the connection of this yoke 48 with this sleeve 51 in the reduced part of the collar by virtue of which the sleeve 51 may move the yoke 48 up and down, and consequently, through the connection of the yoke to the frame 22, move the frame and slides which it carries also up and down.

Fixed to the sleeve 51 is the slotted yoke 52 which extends back and has a guide rod 53 extending up through a guide 54 fixed on the frame 11 of the moving picture machine near the shutter 20. The star wheel shaft 19, hereinbefore mentioned, is extended out from the left side of the machine and has fixed thereon a gear 55 which meshes with a pinion 56 that is fixed to and turns with a crank disk 57 on a stud 58 projecting out from the frame 11 of the machine. This crank disk has a wrist pin 59 that engages in the slot 60 of the slotted yoke 52, which slot is long enough to allow the transverse travel of the wrist pin as it rotates with the disk 57. With the star wheel shaft 19 rotated one-fourth of a revolution to shift a new view of a film into exhibiting position, the spur gear 55 has a pitch diameter four times that of the pinion 56, so that the disk 57 has imparted to it one complete revolution for each one-fourth revolution of the star wheel shaft 19, and for each shift of a view on the film 8. The wrist pin is so positioned in the disk 57 with respect to the position of the star wheel 18 that the slotted yoke 52 and the frame 22 with the slides will be in their lowest position, as shown in Fig. 7, during the period when the star wheel and star wheel shaft are not being rotated, and in which position the desired one of the slides will be in proper alinement with the views of the film thus held in exhibiting position by the star wheel 18 thus held stationary. Then, during the first half of the one-fourth revolution of the star wheel and its shaft and the shifting of the film 8, the disk 57, rotated through one-half revolution, will raise the frame 22 and bring the slide which is being exhibited up out of the exhibiting position, as shown in Fig. 9, and then bring it back down to exhibiting position during the latter half of the one-fourth revolution of the star wheel and its shaft and such shifting of the film.

While I have shown and described specifically certain steps of my improved method, and certain details of construction of apparatus for carrying it out, as well as showing such apparatus combined with and designed particularly with respect to a moving picture machine of a certain design and construction, it will be understood that modifications of both the method and the apparatus may be made to adapt them to particular conditions that may be met with, and therefore I do not wish to be understood as being limited to the precise details of operation and construction and arrangement as are herein set forth as an example of my invention, but

What I claim as new and desire to secure by Letters Patent is:

1. The method of producing composite pictures, which consists in producing a pictorial representation of a fixed scene, producing pictorial representations of successive stages of a moving scene, leaving a part of said representation of the fixed scene clear, and confining said representations of the moving scene to a space adapted for projection through said clear space left in said representation of the fixed scene.

2. The method of producing and exhibiting composite pictures, which consists in producing a pictorial representation of a fixed scene, producing pictorial representations of successive stages of a moving scene, leaving a part of said representation of the fixed scene void whereby a void space is left in the projection thereof, and confining said representations of the moving scene to a space adapted for projection upon the void space left by projection of said representation of the fixed scene, and then bringing the representations of the successive stages of the moving scene successively into alinement with said representation of the fixed scene, and projecting said scenes together, with the representations of the stages of the moving scene projected in said void space left by the projection of said representation of the fixed scene.

3. The method of producing composite pictures, consisting of producing a slide of a fixed scene, and producing a film of a moving scene, leaving a clear space on the slide, and confining the representation of the moving scene on said film, so that the projection of the moving scene will be confined to the clear space on the slide.

4. The method of producing and exhibiting composite pictures, consisting of producing a slide of a fixed scene, and producing a film of a moving scene, leaving a void space on the slide, and confining the representation of the moving scene on said film, so that the projection of the moving scene will be confined to the void space represented by the projection of the slide, and then shifting said film to bring its views of the moving scene successively into alinement with said slide, and projecting said slide and film together, whereby the moving scene is projected on said space represented by the projection of said slide.

5. The method of producing and exhibiting composite pictures, which consists in producing a pictorial representation of a fixed scene, producing pictorial representations of successive stages of a moving scene, leaving a part of said representation of the fixed scene void whereby a void space is left in the projection thereof, and confining said representations of the moving scene to a space adapted for projection upon the void space left by projection of said representation of the fixed scene, and then bringing the representations of the successive stages of the moving scene successively into alinement with said representation of the fixed scene, and coloring said representation of the fixed scene, whereby it will be projected in colors, and projecting said scenes together, with the representations of the stages of the moving scene pictured in said void space left by the projection of said representation of the fixed scene.

6. The method of producing composite pictures, consisting of producing a slide of a fixed scene, and producing a film of a moving scene, leaving a void space on the slide, and confining the representation of the moving scene on said film, so that the projection of the moving scene will be confined to the void space represented by the projection of the slide and coloring said slide to project a colored representation of the scene therefrom, and then shifting said film to bring its views of the moving scene successively into alinement with said slide, and projecting said slide and film together, whereby the moving scene is projected on said void space represented by the projection of said slide.

7. The method of producing and exhibiting composite pictures which consists in producing a representation of a fixed scene with a clear space therein, and producing moving pictures confined to a space such that when the moving pictures and the representation of the fixed scene are projected simultaneously, the projection of the moving pictures will be confined to the clear space in said representation of a fixed scene, and projecting said fixed scene and said moving pictures together with the moving pictures projected through the clear space in said representation of the fixed scene.

8. In apparatus for exhibiting composite pictures, the combination with film carrying and shifting means, of slide carrying means adapted to hold a slide with a view thereon in alinement with a view on the film as held stationary by said film carrying and shifting means.

9. In apparatus for exhibiting composite pictures, the combination with film carrying and shifting means, of slide carrying means adapted to hold a slide with a view thereon in alinement with a view on the film as held stationary by said film carrying and shifting means, and operative connection from said film carrying and shifting means to said slide carrying means, whereby the slide is shifted out of said alinement and into said alinement again during the operation of the film carrying and shifting means to shift the film.

10. In apparatus for exhibiting composite pictures, the combination with film carrying and shifting means, of slide carrying means adapted to hold a slide with a view thereon in alinement with a view on the film as held stationary by said film carrying and shifting means, and means for adjusting said slide toward and away from said film.

11. In apparatus for exhibiting composite pictures, the combination with film carrying and shifting means, of slide carrying means adapted to hold a slide with a view thereon in alinement with a view on the film as held stationary by said film carrying and shifting means, and means for adjusting said slide up and down to bring its view into alinement with a view on said film.

12. In apparatus for exhibiting composite pictures, the combination with film carrying and shifting means, of slide carrying means adapted to hold a slide with a view thereon in alinement with a view on the film as held stationary by said film carrying and shifting means, and means for swinging said slide carrier, with the slide, away from the film, to permit the film to be projected without the projection of the slide.

13. In apparatus for exhibiting composite pictures, the combination with film carrying and shifting means, of slide carrying means adapted to hold a slide with a view thereon in alinement with a view on the film as held stationary by said film carrying and shifting means, and operative connection from said film carrying and shifting means to said slide carrying means, whereby the slide is shifted out of said alinement and into said alinement again during the operation of the film carrying and shifting means to shift the film, and means for swinging said slide carrier, with the slide, away from the film to permit the film to be projected without the projection of the slide, said operative connection being swiveled coaxially with the means for swinging said slide carrier.

14. In apparatus for exhibiting composite pictures, the combination with film carrying and shifting means, of slide carrying means comprising a slide holder adapted to hold a plurality of slides, and means whereby said slide holder may be shifted to bring successive ones of said slides into position with their views in alinement with the views on the film held stationary by said film carrying and shifting means in exhibiting position.

15. In apparatus for exhibiting composite pictures, the combination with film carrying and shifting means, comprising a star wheel and a shaft for said star wheel, of a slide carrier adapted to hold a slide with its view in alinement with a view on the film in exhibiting position, a bracket supported by the film carrying and shifting means, a support for the film carrying means supported and guided for up-and-down movement on said bracket, a yoke fixed to the support for the slide carrying means, a gear on said star wheel shaft, a pinion in mesh with said gear, a crank turning with said pinion, and operative connection from said crank to said yoke, whereby the slide carrier is reciprocated up and down during a fraction of a revolution of said star wheel shaft.

16. In apparatus for exhibiting composite pictures, the combination with film carrying and shifting means, comprising a star wheel and a shaft for said star wheel, of a slide carrier adapted to hold a slide with its view in alinement with a view on the film in exhibiting position, a bracket supported by the film carrying and shifting means, a support for the film carrying means supported and guided for up-and-down movement on said bracket, a yoke fixed to the support for the slide carrying means, a gear on said star wheel shaft, a pinion in mesh with said gear, a crank turning with said pinion, and operative connection from said crank to said yoke, whereby the slide carrier is reciprocated up and down during a fraction of a revolution of said star wheel shaft, said bracket having a hinged connection with said film carrying and shifting means, and said operative connection between said yoke and said crank being swiveled coaxially with said hinged connection, whereby said slide carrier may be swung away from the film without disconnecting said operative connection.

17. In apparatus for exhibiting composite pictures, the combination with film carrying and shifting means, comprising a star wheel and a shaft for said star wheel, of a slide carrier adapted to hold a slide with its view in alinement with a view on the film in exhibiting position, a bracket supported by the film carrying and shifting means, a support for the film carrying means supported and guided for up-and-down movement on said bracket, a yoke fixed to the support for the slide carrying means, a gear on said star wheel shaft, a pinion in mesh with said gear, a crank turning with said pinion, and operative connection from said crank to said yoke, whereby the slide carrier is reciprocated up and down during a fraction of a revolution of said star wheel shaft, the connection of said bracket to said film carrying and shifting means comprising an upright pin, upon which said bracket swings away and carries the slide away from said film, and said operative connection comprising a slotted yoke receiving part of said crank in its slot and sliding on said upright pin and pivotally connected to said yoke.

18. In apparatus for exhibiting composite pictures, the combination with film carrying and shifting means, comprising a plate or door to cover the film, of slide carrying means to hold a slide with its view in alinement with the views on the film when in exhibiting position, and a coaxial hinged mounting for said plate or door and said slide carrying means, whereby either one or both may be swung away from said film.

19. In apparatus for exhibiting composite pictures, the combination with film carrying and shifting means, comprising a plate or door to cover the film, of slide carrying means to hold a slide with its view in alinement with the views on the film when in exhibiting position, and a coaxial hinged mounting for said plate or door and said slide carrying means, whereby either one or both may be swung away from said film, said slide carrier being movable up and down on its mounting, and operative connection from said slide carrier to the film shifting means, whereby the slide carrier moves the slide up out of alinement with said view on the film and back into said alinement during the shifting of the film, said operative connection being swiveled coaxially with the hinging of said door or plate and said slide carrying means.

JOHN E. GARRETTE.

Witnesses:
JAMES N. RAMSEY,
CLARENCE PERDEW.